Figure 1:
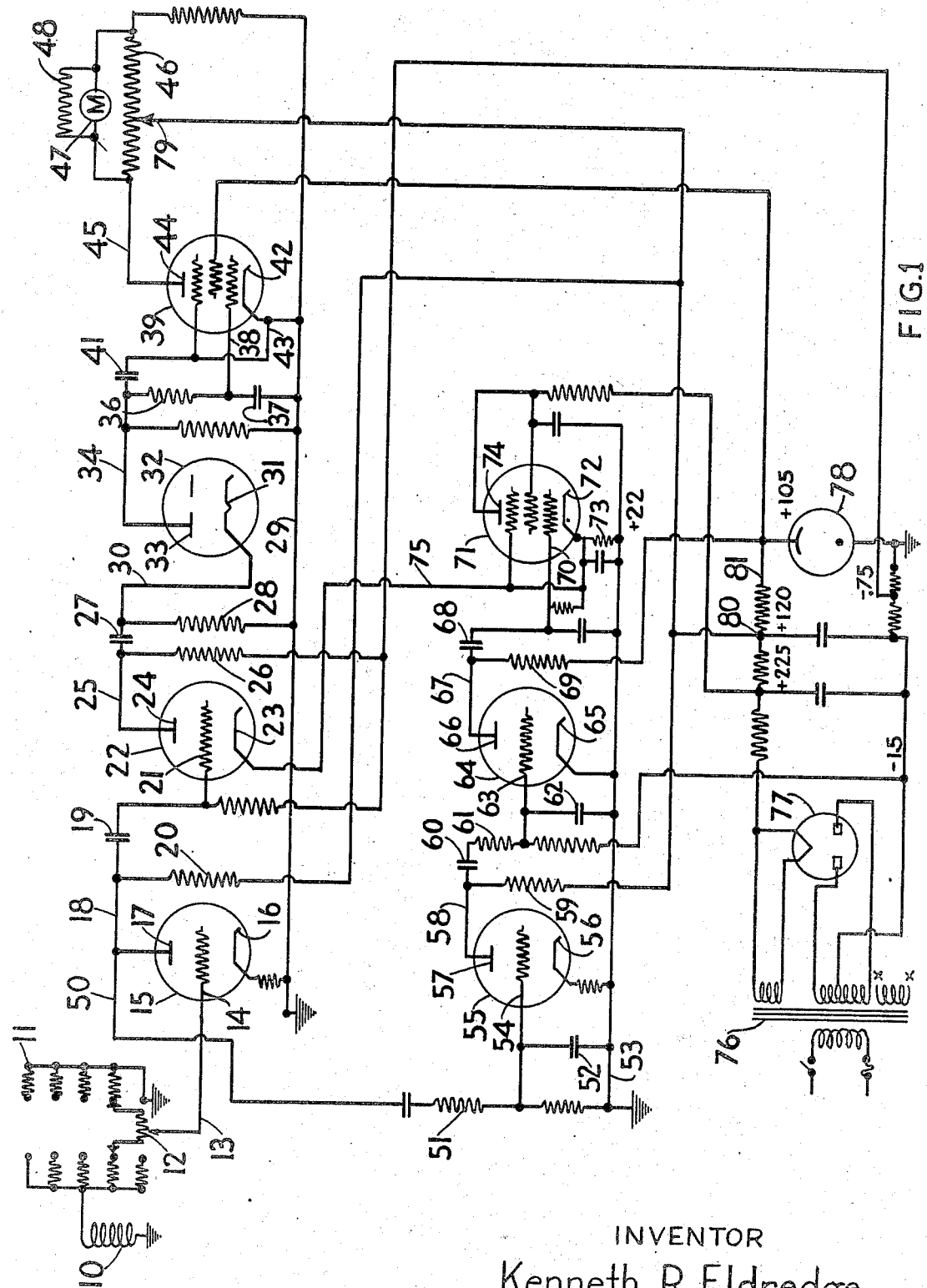

Dec. 21, 1943.   K. R. ELDREDGE   2,337,522
DETONATION MEASUREMENT
Filed May 4, 1943   2 Sheets-Sheet 1

INVENTOR
Kenneth R. Eldredge
By _____
Attorney

Detonation pickup output

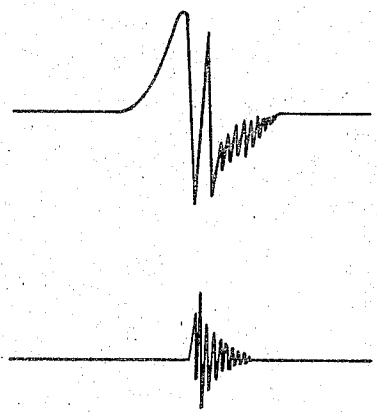

Valve noise   Valve noise

FIG 2 Incoming Signal

FIG 3 Amplified in metering circuit with valve noise rejected

FIG 4 Differentiated to suppress low frequencies in metering circuit

FIG 5 Partially integrated signal in locking circuit

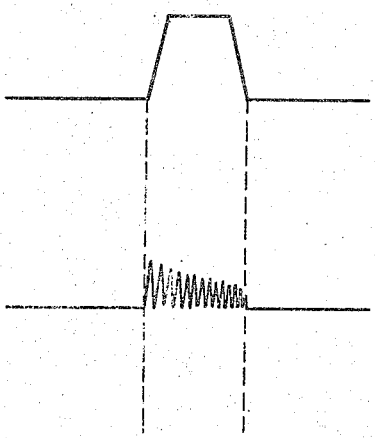

FIG 6 Square wave impulse in locking circuit

FIG 7 Rectified detonation signal to final metering

INVENTOR
Kenneth R. Eldredge

Patented Dec. 21, 1943

2,337,522

UNITED STATES PATENT OFFICE 2,337,522

DETONATION MEASUREMENT

Kenneth R. Eldredge, Berkeley, Calif., assignor to Standard Oil Company of California, San Francisco, Calif., a corporation of Delaware Application May 4, 1943, Serial No. 485,626

5 Claims. (Cl. 177—351)

This invention relates to a means for determining the intensity of detonation in the cylinders of internal combustion engines, and particularly refers to means whereby the measurement is made only during the actual combustion period of the engine cycle.

This invention is particularly adapted to utilize the alternating voltage output of the detonation indicator which is the subject of my Patent No. 2,269,760, issued January 13, 1942. That device utilizes a magnetostrictive element which is stressed by pressure variations in an engine cylinder and correspondingly modifies the magnetic flux passing through a coil to produce an alternating current voltage which faithfully represents at any instant pressure gradient conditions existing in the engine cylinder. The output from such a pickup unit or indicator can be considered to consist of a relatively low-frequency alternating current impulse due to the pressure change in the combustion chamber on which is superimposed relatively high-frequency waves of the detonation effect. In addition to this output, vibration from valve operation or other mechanical effects, which take place before and after the pressure impulse due to combustion, give high-frequency responses which frequently have similar characteristics to those produced by detonation. In order to lock out such extraneous responses from the quantitative metering function of this invention, an arrangement has been perfected which renders a portion of that circuit nonconducting except at such time that the combustion pressure is impressed upon the pickup apparatus. Desirably but not necessarily, the response of the metering portion of this invention to changes in intensity of detonation should be approximately logarithmic. The human ear, which has heretofore been used as a criterion of knock intensity, has a similar response characteristic, i. e., the decibel scale of loudness.

The output of the magnetostriction or other type of pickup unit to which this invention is adapted is, therefore, in the nature of a pressure gradient diagram with the high-frequency detonation and valve vibration voltages superimposed. This invention broadly comprehends the provision of a differentiating interstage coupling arrangement in a metering circuit to largely eliminate the pressure component. A separate circuit which can be designated a locking circuit is provided in which the pressure gradient diagram is integrated and used to provide the means of unlocking the metering circuit or rendering the latter responsive only during the combustion period in the engine cylinder at which time the detonation effects are to be measured.

Heretofore those devices which have had a similar object, that is to prevent the effect of extraneous noises upon a detonation responsive means, have used mechanical vibrations set up in the body of the cylinder of an engine to pick up detonation vibrations and have attempted to limit the time of such indications by synchronizing the indicator with an impulse from the ignition system. Such an arrangement is that of the Lancor Patent No. 2,291,045. These devices, however, give no quantitative results and consequently are not usable where successive tests are to be made on fuels, for example, to determine their knocking characteristics. In other words, they will indicate the presence or absence of detonation but give no reading of the intensity thereof.

Other objects and advantages of this invention will be apparent from the following description and from the accompanying drawings which illustrate a preferred embodiment together with a series of curves showing the effects of various portions of the metering and locking circuits upon a given signal due to detonation and pressure in the engine cylinder.

In the drawings, Figure 1 is a wiring diagram of one embodiment of this invention. Figures 2 to 7 inclusive are curves illustrating the effect of successive operations taking place in the metering and locking circuits of the arrangement of Figure 1.

Referring to Figure 1, reference numeral 10 designates a detonation pickup unit, such as that of my Patent No. 2,269,760 previously mentioned, in which a coil or other means are provided to give alternating current responses to pressure changes within the combustion chamber of an internal combustion engine. The output of pickup unit 10 passes through an attenuator 11 provided with a number of fixed or step positions and a fine adjustment 12. From the attenuator the output passes through lead 13 to the grid 14 of a first amplifier triode 15 having a cathode 16 heated by conventional means (not shown) and a plate 17. From the plate 17 the metering circuit extends through lead 18 through a conventional resistance coupling composed of condenser 19 and resistor 20 to the grid 21 of a second amplifier triode 22 having a conventional cathode 23 and plate 24. Cathode 23 is heated in the usual manner and is normally biased positively by the locking circuit tube 71 when that tube is passing current. This positive bias is set up by the drop across resistor 73 and makes cathode 23 sufficiently positive with regard to grid 21 to cut off tube 22.

The output of triode 22 is passed through lead 25 through a conventional resistance coupler composed of a resistor 26 and a small condenser 27. A second resistor 28 is adapted to cooperate with condenser 27 to differentiate the amplified signals coming from triode 22 (Figure 3) by by-passing to ground lead 29 the low-frequency pressure wave component. This will result in a diagram substantially as that of Figure 4.

When the cathode 23 of triode 22 is made less positive so that said triode can act as an amplifier, the differentiated signal is passed through lead 30 to the cathode 31 of a diode half-wave rectifier 32. The rectified voltage from plate 33 of rectifier 32 passes through lead 34 to a storage and damping circuit composed of storage condenser 41, a damping resistor 36, and condenser 37 which introduces a time delay or damping effect on the rectified signal which is then impressed upon the control grid 38 of the final amplifier pentode 39.

The output from plate 44 of pentode 39 passes through lead 45 to a Wheatstone bridge circuit generally designated 46 in which is connected a current measuring means such as a milliammeter 47 having an appropriate shunt 48.

The locking circuit mentioned above which prevents the operation of the second amplifier triode 22, except at such times as the combustion cycle is actually taking place in the engine cylinder, receives the same amplified signal as does the metering circuit just described from plate 17 of the first amplifier triode 15 by means of lead 50. This signal is partially integrated by the series resistor 51 and condenser 52 to ground lead 53. This acts to bypass to ground the high-frequency components of the amplified signal so that the low-frequency pressure wave component (Figure 5) is impressed upon the grid 54 of the triode amplifier 55. That amplifier is provided with a conventional cathode 56 and a plate 57. The amplified and partially integrated signal is passed from plate 57 through lead 58 to a resistor coupler composed of resistor 59 and condenser 60 and through a second partial integrating circuit composed of resistor 61 and condenser 62. The integrated amplified signal then passes to grid 63 of a second amplifier triode 64 having a conventional cathode 65 and plate 66. The characteristics of this tube are chosen so that substantially a square wave impulse is passed from plate 66 through lead 67 to a resistance coupler composed of condenser 68 and resistor 69 to the control grid 70 of a pentode amplifier 71. Pentode 71 is provided with the usual cathode 72 having a bias resistor 73, the latter being so chosen that when pentode 71 is in its normal condition, namely a conductor for current between cathode 72 and plate 74, the positive bias on that cathode, which is connected by means of lead 75 to the cathode 23 of the second triode amplifier 22 of the metering circuit, will be of such a value that triode 22 will not act as an amplifier. The operating characteristics of pentode 71 are so chosen that when the substantially square wave impulse (Figure 6) is impressed upon control grid 70 that tube becomes nonconducting which permits the bias on cathodes 72 and 23 to become less positive, thereby permitting tube 22 to become an amplifier and to pass on to the remainder of the metering circuit the high frequencies due to the detonation waves. As soon as the square wave impulse has passed, pentode 75 71 immediately becomes conducting, thereby increasing the positive bias on cathodes 72 and 23 and making grid 21 of tube 22 so negative that any undesired signal coming from tube 15 will not be amplified and passed on to the metering circuit, thereby eliminating the impulses due to valve noise and other extraneous effects in the combustion chamber of the engine cylinder.

In the example of Figure 1 a conventional power supply, consisting of a transformer 76, full-wave rectifier 77 and voltage regulator 78 with the usual filters and voltage divider 81, is illustrated. Obviously this could be replaced by any suitable sources of direct current. It is desirable that the movable tap 79 of a Wheatstone bridge 46 be connected at an intermediate point 80 in the voltage divider 81. It has been found that variations in individual characteristics of the final metering amplifier pentode 39 may be such that the connection of point 80 into the voltage divider can be chosen in such a manner that variations in voltage which would otherwise affect the consistency in output of pentode 39 may be compensated.

Although a single example of this invention has been described and illustrated, it is obvious that numerous modifications and changes could be made without departing from the invention and all such modifications that come within the scope of the appended claims are embraced thereby.

I claim:

1. Apparatus for measuring the average intensity of detonation in an internal combustion engine in which there are means responsive to pressure variations in the engine combustion chamber, said means having an alternating current voltage output signal which includes a detonation frequency superimposed upon a pressure wave frequency, comprising a metering circuit including means for amplifying the output of said pressure responsive means, said amplifying means having at least one cathode, means for differentiating said amplified output to suppress the pressure wave frequency component thereof, means for rectifying said differentiated signal, an amplifier for said rectified signal and a meter for measuring the average amplitude of said rectified and amplified signal; a locking circuit, means in said locking circuit for receiving the signal output of said pressure responsive means, means in said locking circuit for integrating said amplified signal to suppress the detonation response frequency thereof and to modify said signal to a substantially square wave impulse, an amplifier in said locking circuit having a cathode, said cathode being in parallel with the cathode or grid return of an amplifier in said metering circuit, and bias-forming means for said cathodes, so constructed and arranged that said square wave impulse from a given pressure and detonation response signal will cause said amplifier in said metering circuit to be operable only during the duration of said given pressure wave impulse, whereby the current due to detonation frequencies will pass through said metering circuit and be indicated on said meter.

2. Apparatus according to claim 1 with the addition of means in said metering circuit for introducing a time delay for said rectified signal, so constructed and arranged that said meter will read the average peak intensity of the rectified detonation frequency currents as averaged over a plurality of successive signals.

3. Apparatus for measuring the average intensity of detonation in an internal combustion engine in which there are means responsive to pressure variations in the engine combustion chamber, said means having an alternating current voltage output which includes a detonation frequency superimposed upon a pressure frequency, comprising a metering circuit including means for differentiating the alternating current voltage signal to remove the pressure wave frequency component and an amplifier for the alternating current voltage output, biasing means for said amplifier to maintain it in an inoperative condition, a locking circuit, means in said locking circuit for integrating said same signal to remove the detonation response frequency therefrom, and means responsive to said integrated pressure wave frequency for periodically removing the bias from said metering circuit amplifier, and means for metering the differentiated detonation frequency component of said signal.

4. Apparatus for measuring detonation in an internal combustion engine, in which there is a pressure responsive unit connected to the engine combustion chamber, the signal output of said unit comprising a low frequency alternating current impulse due to combustion pressure on which is superimposed a high frequency alternating current due to detonation effects; said apparatus comprising an amplifier, a differentiator, a rectifier, and a second amplifier for said rectified signal; a meter for measuring the average amplitude of the resultant direct current impulses; and a locking means actuated by said combustion pressure alternating current impulse for rendering said signal amplifying means inoperative except during the duration of said alternating current impulse wave due to said combustion pressure wave.

5. Apparatus for measuring the intensity of detonation in an internal combustion engine on which there are means responsive to pressure variations in the engine combustion chamber, said means having a composite alternating voltage signal output which includes a higher frequency detonation component superimposed upon a lower frequency combustion pressure component, comprising a metering circuit, differentiating means in said circuit for making it responsive only to the detonation frequency component, a normally inoperative amplifier in said metering circuit, a locking circuit, means in said locking circuit for integrating said composite alternating voltage signal to obtain a single electrical impulse due to the lower frequency combustion pressure component, means responsive to said single impulse for rendering said metering circuit amplifier operative during said single impulse, and means for metering the differentiated detonation frequency component of said signal.

KENNETH R. ELDREDGE.